(12) United States Patent
Williams

(10) Patent No.: US 10,688,909 B2
(45) Date of Patent: Jun. 23, 2020

(54) TIE-DOWN MANAGEMENT SYSTEM FOR SECURING LOADS ON A VEHICLE BED

(71) Applicant: Robert A. Williams, Cookeville, TN (US)

(72) Inventor: Robert A. Williams, Cookeville, TN (US)

( * ) Notice: Subject to any disclaimer, the term of this patent is extended or adjusted under 35 U.S.C. 154(b) by 79 days.

(21) Appl. No.: 16/009,195

(22) Filed: Jun. 14, 2018

(65) Prior Publication Data

US 2018/0361908 A1    Dec. 20, 2018

Related U.S. Application Data

(60) Provisional application No. 62/520,516, filed on Jun. 15, 2017.

(51) Int. Cl.
*B60P 7/08* (2006.01)
*B25J 1/04* (2006.01)

(52) U.S. Cl.
CPC ............. *B60P 7/0853* (2013.01); *B25J 1/04* (2013.01)

(58) Field of Classification Search
CPC . B60P 7/0853; B25J 1/04; A47F 13/06; B66F 19/00; B25B 25/00; H02G 1/083
USPC ............... 294/175, 24, 74, 191, 209–211; 254/134.3 R, 134.3 FT; 410/85, 96, 100
See application file for complete search history.

(56) References Cited

U.S. PATENT DOCUMENTS

| | | | |
|---|---|---|---|
| 103,627 A | 5/1870 | Lamb | |
| 677,188 A | 6/1901 | Drees | |
| 2,811,127 A * | 10/1957 | Palsson | B63B 21/54 114/221 R |
| 3,820,817 A | 6/1974 | Harold | |
| 3,854,424 A | 12/1974 | Blunden et al. | |
| 3,865,048 A | 2/1975 | Wallace | |
| 3,936,088 A * | 2/1976 | Williams | B25J 1/04 294/175 |
| 4,130,067 A | 12/1978 | Kilgus et al. | |
| 4,153,286 A | 5/1979 | Piper et al. | |
| 4,624,494 A | 11/1986 | Huppert | |
| 5,454,611 A | 10/1995 | Wanat | |
| 5,593,239 A | 1/1997 | Sallee | |
| 5,622,399 A * | 4/1997 | Albright | A62B 1/18 294/24 |
| 6,007,124 A | 12/1999 | Thies, Jr. | |
| 6,196,092 B1 | 3/2001 | Potter | |
| 6,375,162 B1 | 4/2002 | Johnson | |

(Continued)

*Primary Examiner* — Dean J Kramer

(74) *Attorney, Agent, or Firm* — LaMorte & Associates, P.C.

(57) ABSTRACT

A tie-down management system that is used to manipulate a tie-down strap through and around complex cargo. Pockets are sewn onto the strap proximate each end. A hand tool is provided having a handle and a shaft. The shaft terminates with a hook that is shaped and sized to selectively engage the opposing pockets on the flexible strap. When the hook is engaged with a pocket on the flexible strap, the flexible strap and the hand tool become mechanically interconnected. The hand tool can then be used to manipulate the flexible strap around and through complex pathways. The reach of the hand tool can also be extended by connecting the hand tool to an extension pole. By using the tie-down management system, the amount of climbing, bending and stretching required to secure a complex load is reduced.

19 Claims, 6 Drawing Sheets

(56) References Cited

U.S. PATENT DOCUMENTS

| | | | |
|---|---|---|---|
| 6,499,778 B2 * | 12/2002 | Boulay | B25B 9/00 |
| | | | 254/134.3 R |
| 7,192,230 B2 * | 3/2007 | Hartman | B60P 7/0823 |
| | | | 410/98 |
| 7,357,612 B1 | 4/2008 | Paul | |
| 8,915,685 B2 * | 12/2014 | Flores | B65B 13/181 |
| | | | 410/99 |
| 2007/0089355 A1 | 4/2007 | Burgett, Sr. | |
| 2007/0215848 A1 | 9/2007 | Gaudreault et al. | |
| 2008/0314372 A1 * | 12/2008 | Guindon | B60P 7/0853 |
| | | | 124/5 |

* cited by examiner

TIE-DOWN MANAGEMENT SYSTEM FOR SECURING LOADS ON A VEHICLE BED

RELATED APPLICATIONS

This application claims the benefit of U.S. Provisional Patent Application No. 62/520,516, filed Jun. 15, 2017.

BACKGROUND OF THE INVENTION

1. Field of the Invention

The present invention relates to systems, methods and tools used to help thread an anchor chain, or similar strapping, around cargo that needs to be secured to a trailer bed. More particularly, the present invention relates to systems, methods, and tools that are used to manipulate anchor chains and tie-downs to secure cargo and other loads on equipment trailers and flatbed trucks.

2. Prior Art Description

Heavy equipment and other bulky cargo is often transported on flatbed trucks or truck trailers. Such heavy cargo must be secured in place, so it does not move during transport. Typically, heavy equipment and similar cargo are secured using anchor chains and/or heavy-duty straps. The chains and/or straps attach to tie down points in and around the bed of the trailer.

Heavy equipment and bulky cargo typically have complex shapes. Due to the complex shapes of the cargo. the anchor chains need to be threaded through various features of the cargo in order to properly anchor the cargo. Likewise, the anchor chains and strapping must be threaded into the various anchor features that are formed into the bed of the flatbed truck or truck trailer. Threading a length of heavy chain or heavy strapping through, over, under and around various obstacles is often very difficult and time consuming. It often requires a person climb onto the cargo and manually manipulate the chain or strapping in and around a variety of obstacles. Not only is this labor intensive and time consuming, but it is dangerous. The process requires a person to climb on and around equipment and cargo that is otherwise unsecured.

Furthermore, the pushing and pulling of anchor chains and strapping often requires great dexterity and flexibility. Not all people have such physical abilities. The result is often strained muscles, pulled muscles, and other injuries that can greatly reduce productivity.

In the real world, truck drivers and other cargo handlers who commonly secure loads, use a variety of improvised tools to assist in the process. Many use lengths of pipe to push and pull two sections of chain or strapping together. The improvised tools are often heavy, hard to manipulate and have a poor design for the job at hand. Once the lengths of chain or strapping are brought together, they are typically joined to a ratcheted tightener that pulls the chain or strapping taut. One of the only commercial tools that a truck driver or cargo loader typically possesses is a tool that assists in the operation of the ratcheted tightener. This ensures that the anchor chains and/or strapping are made as taut as possible. Such tightening tools are exemplified by U.S. Pat. No. 6,196,092 to Potter, and U.S. Patent Application No. 2007/0215848 to Gaudreault.

Tools that are designed to tighten a ratcheted tightener are typically not well suited for moving chain and or strapping around and through features of bulky cargo. A need therefore exists for a system and method to help manipulate heavy anchor chains and strapping through, over, under and around various obstacles while securing heavy equipment to the bed of a flatbed truck or a truck trailer. This need is met by the present invention as described and claimed below.

SUMMARY OF THE INVENTION

The present invention is a tie-down management system that is used to manipulate a specialized tie-down strap through and around complex cargo, such as heavy equipment. The specialized strap is a flexible strap having two opposing ends. Pockets are sewn onto the strap proximate each end. Mechanical connectors, such as hooks and chains are used to terminate the flexible straps just beyond the pockets.

A hand tool is provided having a handle and a shaft. The shaft terminates with a hook that is shaped and sized to selectively engage the opposing pockets on the flexible strap. When the hook is engaged with a pocket on the flexible strap, the flexible strap and the hand tool become mechanically interconnected. The hand tool can then be used to manipulate the flexible strap around and through complex pathways. The hook of the hand tool can disengage the flexible strap by a simple manipulation of the hand tool. The reach of the hand tool can also be extended by connecting the hand tool to an extension pole. By using the tie-down management system, the amount of climbing, bending and stretching required to secure a complex load is greatly reduced. In this manner, complex cargo can be secured to a truck or trailer by using less labor and in a manner that has a higher degree of safety.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention tie-down management system can be embodied in many ways to work with many types of equipment, the embodiment illustrated shows the tie-down management system being used on a common flatbed truck. This embodiment is selected in order to set forth one of the best modes contemplated for the invention. The illustrated embodiment, however, is merely exemplary and should not be considered a limitation when interpreting the scope of the appended claims.

Figure 1:
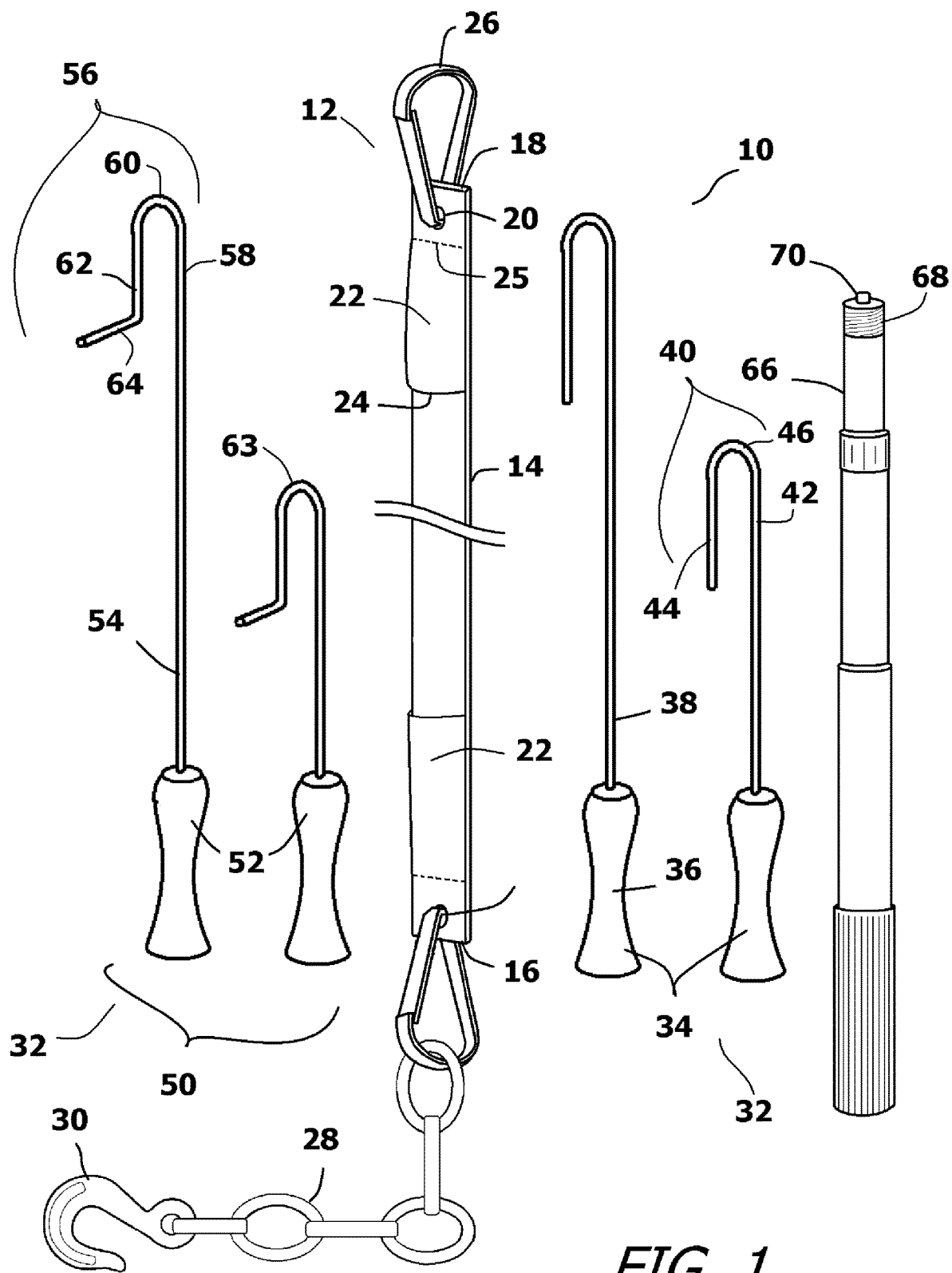
FIG. 1 is a perspective view of an exemplary embodiment of the components forming the tie-down management system.

Referring to FIG. 1, the overall assemblage of components that forms the exemplary tie-down management system 10 is shown. The tie-down management system 10 includes a strap assembly 12. The strap assembly 12 consists of a length of flexible strap 14. The flexible strap 14 has a preferred length of between four feet and eight feet and may be sold in different lengths to meet different needs. The flexible strap 14 has a first end 16 and an opposite second end 18. Grommets 20 are mounted to the flexible strap 14 at both the first end 16 and the opposite second end 18. The grommets 20 are used to attached auxiliary components to the flexible strap 14.

Pockets 22 are formed on the flexible strap 14 just prior to the grommets 20. The pockets 22 can be formed on one side of the flexible strap 14 or on both sides of the flexible strap 14. The pockets 22 at the first end 16 of the flexible strap 14 have a pocket opening 24 that faces away from the first end 16. That is, if the flexible strap 14 were taut and straight, the pocket opening 24 of the pocket 22 at the first end 16 would be facing the opposing second end 18 of the flexible strap 14. Likewise, the pockets 22 at the second end 18 of the flexible strap 14 have a pocket opening 24 that faces away from the second end 18 of the flexible strap 14. It will therefore be understood that the pockets 22 at both ends of the flexible strap 14 have opposing orientations.

The pockets 22 at the first end 16 of the flexible strap 14 and the pockets 22 at the second end 18 of the flexible strap 14 are the same shape and size. Each pocket 22 is sewn to the flexible strap 14 and is provided with both an internal pocket length L1 and an internal pocket width W1.

The grommets 20 are positioned between the bottom seams 25 of the pockets 22 and the ends of the flexible strap 14. Carabiners or similar connectors 26 are joined to the grommets 20. The connectors 26 are capable of being selectively attached to one of the anchor chains on the flatbed truck or truck trailer. A short length of chain 28 is preferably attached to the connector 26 at the first end 16 of the flexible strap 14. The short length of chain 28 has a preferred length of between six inches and two feet. The short length of chain 28 terminates with an anchor hook 30.

Figure 2:
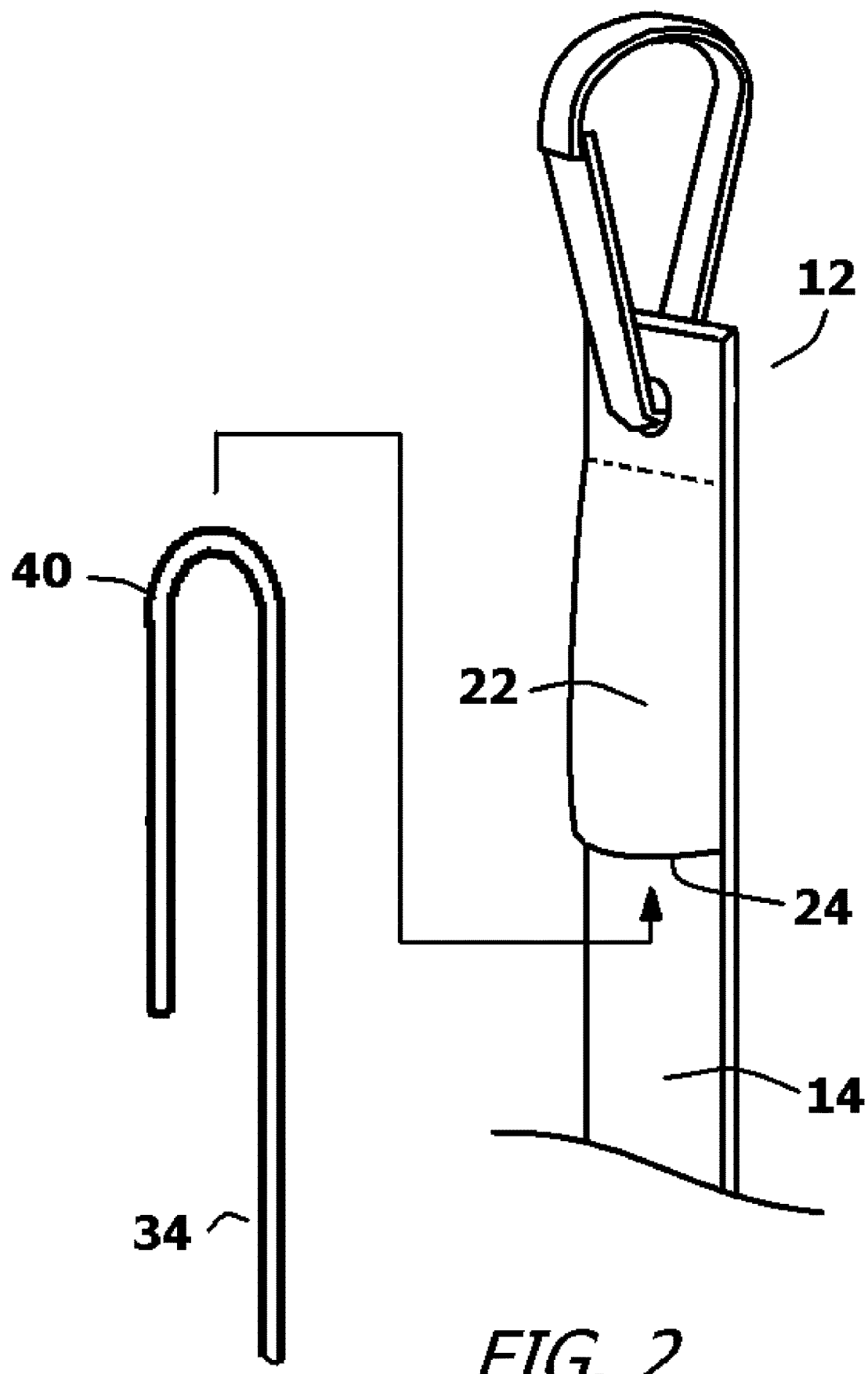
FIG. 2 shows a pocket hook from a pocket hook tool and a pocket on the strap assembly to illustrate interconnectability.
Figure 3:
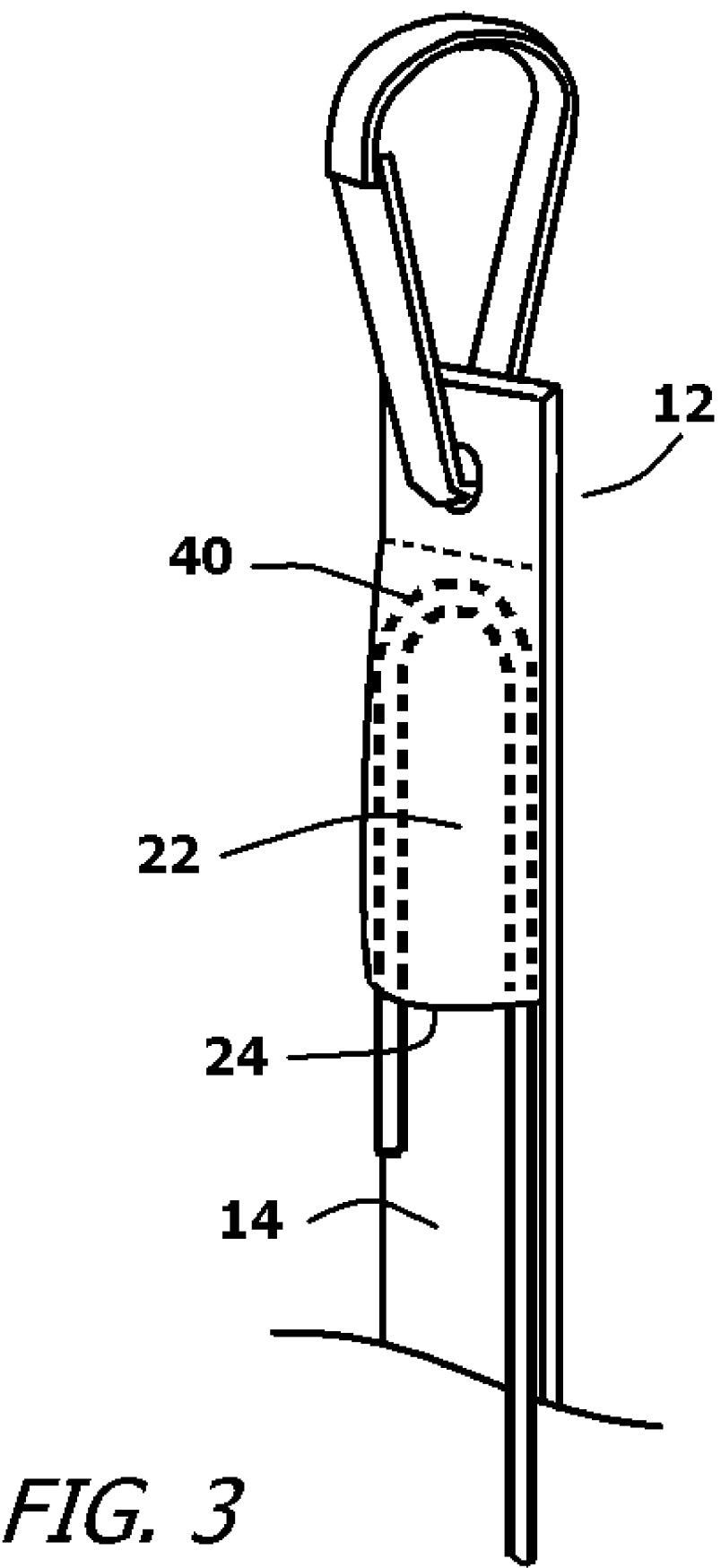
FIG. 3 shows the pocket hook from FIG. 2 engaged with the pocket from FIG. 2.

The tie-down management system 10 utilizes a series of hand tools 32 to manipulate the strap assembly 12. The hand tools 32 include pocket hook tools 34. Pocket hook tools 34 are tools with handles 36 and elongated shafts 38. Referring to FIG. 2 and FIG. 3 in conjunction with FIG. 1, it can be seen that the elongated shafts 38 are formed into pocket hooks 40. The pocket hooks 40 are shaped and sized to enter and engage the pockets 22 formed at the ends 16, 18 of the flexible strap 14. That is, each pocket hook 40 has a shank 42 and a front section 44 that are parallel. The shank 42 and the front section 44 are joined by a bend 46. The diameter of the bend 46 is no greater than the pocket width W1 within the pocket 22. As such, the bend 46 and a section of both the shank 42 and the front section 44 can pass into the pocket 22. As such, using the pocket hooks 40, the pockets 22 on the strap assembly 12 can be selectively engaged to push and steer the strap assembly 12 through, over, under or around an obstacle. Once properly positioned, the pocket hook 40 can be simply pulled out of the pocket 22. Additionally, the front sections 44 of the pocket hooks 40 are longer than the pocket length L1 of the pockets 22. This provides the pocket hooks 40 with a throat depth that is at least as long as the pockets 22. This prevents the front sections 44 of the pocket hooks 40 from getting snagged within the pockets 22.

Figure 4:
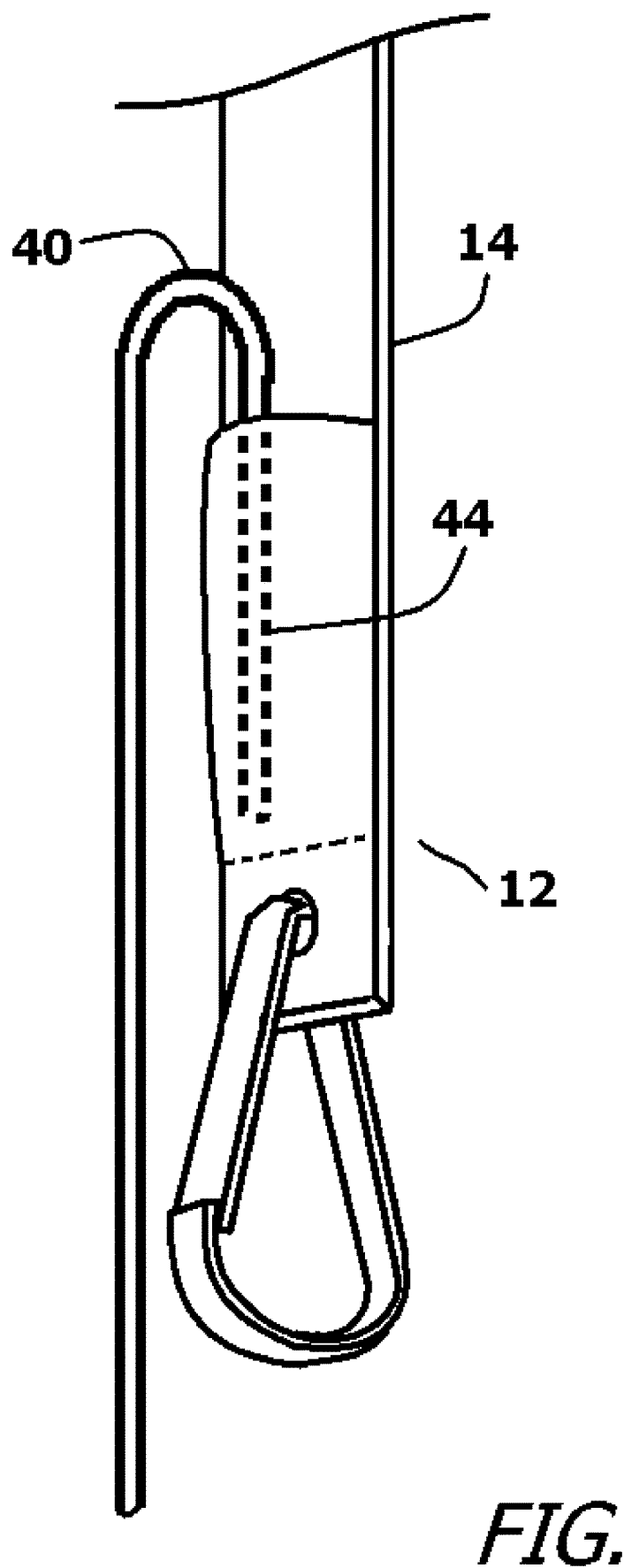
FIG. 4 shows a second way for the pocket hook of a pocket hook tool to engage a pocket on the strap assembly.

Referring to FIG. 4 in conjunction with FIG. 1, it can also be seen that the front section 44 of the pocket hooks 40 can be used to hook one of the pockets 22 on the strap assembly 12. As such, using the pocket hooks 40, the pockets 22 on the strap assembly 12 can be selectively engaged to pull and steer the strap assembly 12 through, over, under or around an obstacle.

Figure 5:
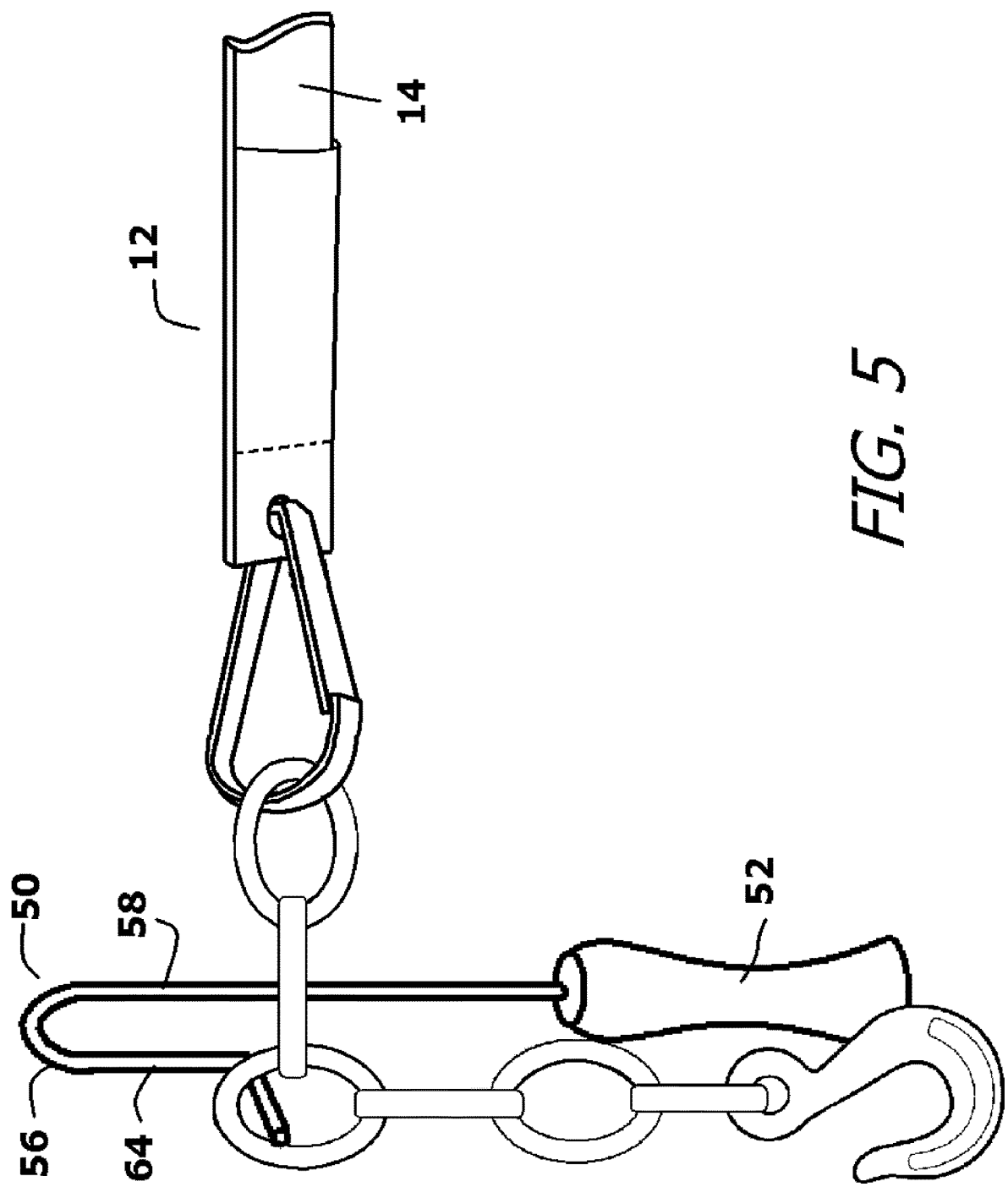
FIG. 5 shows a chain hook on a chain hook tool engaging the short length of chain at one end of the strap assembly.

Referring to FIG. 5 in conjunction with FIG. 1, it can be seen that the tie-down management system 10 also includes chain hook tools 50. The chain hook tools 50 are hand tools with handles 52 and elongated shafts 54. The ends of the elongated shafts 54 are formed into chain hooks 56. The chain hooks 56 have a shank 58, a bend 60, and a front section 62 that form a loop 63. The loop 63 can fit into any pocket 22 on the flexible strap 14. However, an additional foot extension 64 is provided that extends at a perpendicular from the front section 62. The chain hooks 56 can engage the short length of chain 28 at the first end 16 of the strap assembly 12. The chain hooks 56 can also engage the hook connectors 26 at either end 16, 18 of the strap assembly 12. Lastly, the chain hooks 56 can engage the links of any anchor chains present on the flatbed truck or truck trailer. As such, using the chain hook tools 50, the strap assembly 12 and/or any anchor chain can be manipulated through, over, under and around various obstacles.

Often heavy equipment being transported is large and contains anchor points that are elevated above the bed of the flatbed truck or truck trailer. Also, it is not uncommon for an anchor chain on a flatbed truck or truck trailer to be passed over the top of a large piece of equipment. Referring back to FIG. 1, it can be seen that in order to help manipulate the strap assembly 12 over a large piece of equipment, an extension pole 66 is provided. The extension pole 66 is a telescoping pole that can be adjusted to different lengths. The extension pole 66 has a connector 68 at one end that can engage the handles 36, 52 of either the pocket hook tools 34 or the chain hook tools 50. A magnet 70 is preferably present at the end of the extension pole 66. The magnet 70 enables the extension pole 66 to directly engage an anchor chain or the short length of chain 28 on the strap assembly 12.

Figure 6:
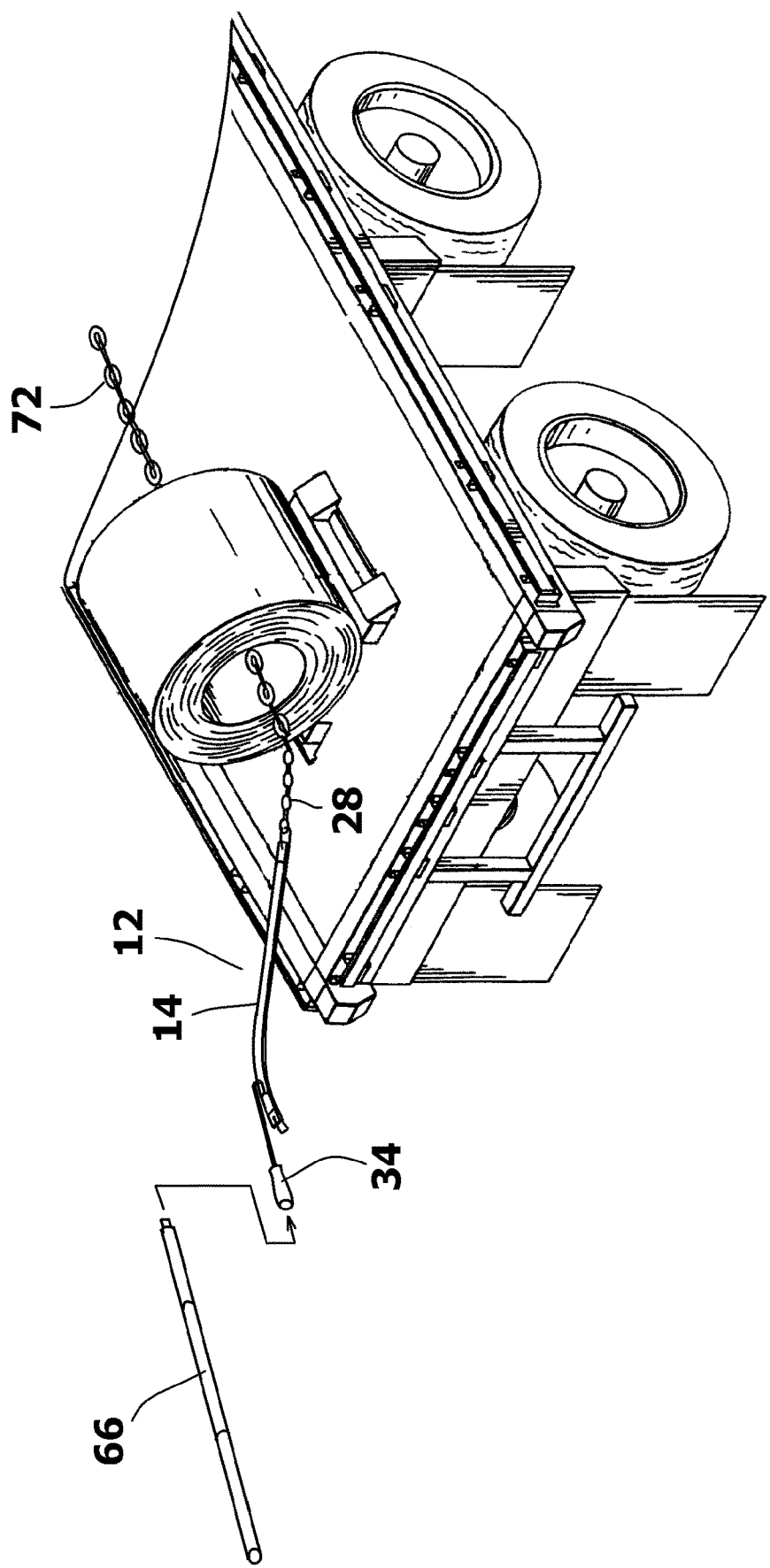
FIG. 6 shows the application of the tie-down management system to a load on a flat bed truck trailer.

Referring to FIG. 6, it will be understood that in order to utilize the present invention tie-down management system 10, the strap assembly 12 is connected to the anchor chain 72 on a truck bed or trailer bed. The strap assembly 12 serves as the needle to the thread of the anchor chain 72. That is, the strap assembly 12 is attached to an anchor chain 72. The strap assembly 12 is then threaded through, over, under and around any obstacles. The strap assembly 12 is manipulated using the pocket hook hand tools 34, the chain hook hand tools 50, and the extension pole 66. This enables the strap assembly 12 to be advanced through small spaces that are too small or too long to reach by hand. The strap assembly 12 is far easier to manipulate and advance than is the much heavier anchor chain 72. Once the strap assembly 12 is manipulated through, over, around and under obstacles, it can be pulled to lead the attached anchor chain 72 through, over, around and under those same obstacles. Once properly positioned, the anchor chain 72 is tightened in the traditional manner and the cargo is secured.

It will be understood that the embodiment of the present invention that is illustrated and described is merely exemplary and that a person skilled in the art can make many variations to that embodiment. For example, the present invention tie down management system can be used to lead anchor straps through obstacles other than anchor chains. All such embodiments are intended to be included within the scope of the present invention as defined by the appended claims.

What is claimed is:

1. A tie-down management system, comprising:
   a flexible strap of a first length that extends between a first end and an opposite second end;
   opposing pockets that include a first pocket and a second pocket, wherein said first pocket is disposed on said flexible strap proximate said first end, said first pocket having a first pocket opening that faces away from said first end, and wherein said second pocket is disposed on said flexible strap proximate said second end, said second pocket having a second pocket opening that faces away from said second end;
   a hand tool having a handle and a shaft that extends from said handle, wherein said shaft terminates with a hook that is shaped and sized to selectively engage either of said two opposing pockets, therein mechanically joining said flexible strap to said hand tool and enabling said hand tool to physically manipulate said flexible strap.

2. The system according to claim 1, wherein all of said opposing pockets have a common pocket depth.

3. The system according to claim 2, wherein said hook has a throat depth that is at least as great as said common pocket depth.

4. The system according to claim 1, wherein said opposing pockets have a common pocket width.

5. The system according to claim 4, wherein said hook has a shank and a front section that is parallel to said shank, wherein said front section and said shank are joined by a bend with a bend diameter no greater than said common pocket width to enable said front section and said shank to pass together into any of said opposing pockets.

6. The system according to claim 5, wherein a foot extension extends from said front section of said hook, wherein said foot extension is perpendicular to said front section.

7. The system according to claim 1, further including a first hook connector joined to said flexible strap proximate said first end.

8. The system according to claim 1, further including a second hook connector joined to said flexible strap proximate said second end.

9. The system according to claim 8, further including a chain that extends from said second hook connector.

10. The system according to claim 9, wherein said chain terminates with a hook connector.

11. The system according to claim 1, further including an extension pole, wherein said extension pole mechanically interconnects with said handle of said hand tool.

12. The system according to claim 11, wherein said extension pole has an adjustable length.

13. A tie-down management system, comprising:
    a flexible strap of a first length that extends between a first end and an opposite second end;
    pockets sewn onto said flexible strap proximate said first end and said second end, wherein each of said pockets has a pocket width and a pocket depth;
    a hand tool having a handle and a shaft that extends from said handle, wherein said shaft terminates with a hook that is shaped and sized to selectively engage either of said hook pockets, therein mechanically joining said flexible strap to said hand tool and enabling said hand tool to physically manipulate said flexible strap.

14. The system according to claim 13, wherein said hook has a throat depth that is at least as great as said pocket depth.

15. The system according to claim 13, wherein said hook has a shank and a front section that is parallel to said shank, wherein said front section and said shank are joined by a bend with a bend diameter no greater than said pocket width to enable said front section and said shank to pass together into either of said pockets.

16. The system according to claim 15, wherein a foot extension extends from said front section of said hook, wherein said foot extension is perpendicular to said front section.

17. The system according to claim 13, further including a first hook connector joined to said flexible strap proximate said first end.

18. The system according to claim 17, further including a second hook connector joined to said flexible strap proximate said second end.

19. The system according to claim 18, further including a chain that extends from said second hook connector.

* * * * *